United States Patent
Lv et al.

(10) Patent No.: US 8,982,819 B2
(45) Date of Patent: Mar. 17, 2015

(54) METHOD AND SYSTEM FOR CHANNEL DATA TRANSMISSION IN WIRELESS NETWORK

(75) Inventors: Kaiying Lv, Shenzhen (CN); Bo Sun, Shenzhen (CN); Nan Li, Shenzhen (CN); Feng Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 102 days.

(21) Appl. No.: 13/639,912

(22) PCT Filed: Jul. 27, 2011

(86) PCT No.: PCT/CN2011/077686
§ 371 (c)(1),
(2), (4) Date: Oct. 8, 2012

(87) PCT Pub. No.: WO2012/041119
PCT Pub. Date: Apr. 5, 2012

(65) Prior Publication Data
US 2013/0176954 A1   Jul. 11, 2013

(30) Foreign Application Priority Data

Sep. 30, 2010   (CN) .......................... 2010 1 0508588

(51) Int. Cl.
| | | |
|---|---|---|
| H04W 72/04 | (2009.01) | |
| H04W 28/20 | (2009.01) | |
| H04W 28/04 | (2009.01) | |
| H04W 74/08 | (2009.01) | |

(52) U.S. Cl.
CPC ............ *H04W 72/04* (2013.01); *H04W 28/042* (2013.01); *H04W 28/20* (2013.01); *H04W 74/08* (2013.01)
USPC ....................................................... 370/329

(58) Field of Classification Search
CPC ... H04W 72/04; H04W 74/08; H04W 28/042; H04W 28/20

USPC ......... 370/310, 328, 329, 431, 437, 445, 447, 370/462; 455/403, 422.1, 450, 452.1
See application file for complete search history.

(56) References Cited

U.S. PATENT DOCUMENTS

| | | | |
|---|---|---|---|
| 2007/0036113 A1* | 2/2007 | van der Gaast et al. | ...... 370/335 |
| 2007/0171860 A1* | 7/2007 | Li et al. | ........................ 370/329 |

(Continued)

FOREIGN PATENT DOCUMENTS

| | | |
|---|---|---|
| CN | 1946087 A | 4/2007 |
| CN | 101039333 A | 9/2007 |
| CN | 101729370 A | 6/2010 |

OTHER PUBLICATIONS

International Search Report for PCT/CN2011/077686 dated Sep. 27, 2011.

*Primary Examiner* — Obaidul Huq
(74) *Attorney, Agent, or Firm* — Ling Wu; Stephen Yang; Ling and Yang Intellectual Property

(57) ABSTRACT

The present invention discloses a method and system for channel data transmission in a wireless network. The method includes: after a transmitting station and a receiving station determine a channel bandwidth to use for data transmission by interaction and negotiation, the transmitting station transmitting data to the receiving station with the determined channel bandwidth. The present invention further discloses a transmitting station. The present invention can solve the existing collision problem caused by contention for channels between the hidden stations and the current transmission stations, and thus can take full advantage of the effective transmission bandwidth in the large bandwidth system of a wireless network and increase the frequency spectrum utilization of large bandwidth, and at the same time ensure the backward compatibility with the large bandwidth system and its co-existence with conventional systems.

18 Claims, 3 Drawing Sheets

(56) References Cited

U.S. PATENT DOCUMENTS

| | | | |
|---|---|---|---|
| 2008/0062867 A1* | 3/2008 | Lee et al. | 370/230 |
| 2008/0112380 A1* | 5/2008 | Fischer | 370/338 |
| 2010/0254261 A1* | 10/2010 | Dattagupta et al. | 370/230 |
| 2012/0218983 A1* | 8/2012 | Noh et al. | 370/338 |

* cited by examiner

METHOD AND SYSTEM FOR CHANNEL DATA TRANSMISSION IN WIRELESS NETWORK

TECHNICAL FIELD

The present invention relates to a method of data transmission in wireless network communication, and in particular, to a method and system for channel data transmission in Wireless Local Area Network (WLAN) communication.

BACKGROUND OF THE RELATED ART

At present, in the field of wireless network, WLAN develops rapidly, the needs and requirements on the coverage of the WLAN are increasing, and the requirements on the throughput are also increasing. In group IEEE802.11 of the industrial specification of the Institute of Electrical and Electronic Engineers, most common WLAN technologies of a series of standards such as 802.11a, 802.11b, 802.11g etc. are defined successfully, and then other task groups appear in succession, which devote themselves to the development of specifications involving improvements of existing 802.11 technologies, for example, the 802.11n task group proposes the requirements on High Throughput (HT) to support a data rate up to 600Mbps; and the 802.11ac task group further proposes a concept of Very High throughput (VHT), which increases the data rate to 1Gbps by introducing a larger channel bandwidth. The new protocol needs backward compatibility with the former protocols.

In 802.11, one Access Point (AP) and multiple Stations (STAs) associated with the AP constitute one Basic Service Set (BTS). The 802.11 defines two kinds of operation modes, which are Distributed Coordination Function (DCF) and Point Coordination Function (PCF), and improvement modes for the two operation modes, which are Enhanced Distributed Channel Access (EDCA) and Hybrid Coordination Function Controlled Channel Access (HCCA). Wherein, the DCF is a most basic operation mode, which takes use of the CSMA with Collision Avoidance (CSMA/CA) mechanism to make multiple STAs share a wireless channel. The EDCA is an enhanced operation mode, which uses the CSMA/CA mechanism to make multiple queues of different priorities share a wireless channel and can subscribe one Transmission Opportunity (TXOP).

When multiple wireless STAs share a wireless channel for data transmission, the collision detection for the wireless environment becomes very difficult, one large problem of which is hidden STAs, as shown in FIG. 1. STA A transmits data to STA B, and meanwhile, STA C also transmits data to STA B. As both the STA C and the STA A are located in the coverage of each other, transmitting data by the STA A and the STA C at the same time will lead to collision. From the point of view of the STA A, the STA C is a hidden STA, vice versa.

In order to solve the problem of hidden STAs, 802.11 proposes a virtual channel detection mechanism, i.e., when the transmitting STA and the receiving STA perform channel subscription, time information of the subscribed channel is included in the frame header of the radio frame, for example, when the transmitting STA transmits a Request to send (RTS) including the time information of the subscribed channel for channel subscription, and the receiving STA transmits a Clear to send (CTS) which also includes time information of the subscribed channel to acknowledge the channel subscription, to ensure that the transmitting party can complete the frame exchange. After receiving the radio frame including the time information of the subscribed channel, other visiting STAs set a value of a Network Allocation Vector (NAV) which is stored locally as a maximum of the above time information of the subscribed channel. Within the NAV time, the other visiting STAs will not transmit data, thus avoiding the hidden node from competing for channels, which causes collision. Only after the NAV time reduces to zero, the other visiting STAs will transmit data. The method of using the RTS/CTS frames is shown in FIG. 2.

The above RTS/CTS mechanism is primarily applied to a traditional channel bandwidth of 20 MHz. With the evolution of the 802.11 protocol, the traditional channel bandwidth of 20 MHz has gradually been extended to large bandwidth channels of 40 MHz, 80 MHz, 120 MHz, and even 160 MHz, and these large bandwidth channels are formed by binding several 20 MHz, wherein, one 20 MHz is referred to as a primary channel or the first channel, and other channels of 20 MHz are referred to as auxiliary channels or the second channel, the third channel, and so on. On a frequency spectrum of 5 GHz, the large bandwidth channel is typically comprised of non-overlapping channels of 20 MHz, and according to a channelization principle, the bandwidth of 160M therein is comprised of two adjacent or non-adjacent bandwidths of 80M, and each bandwidth of 80M is comprised of two adjacent channels of 40 MHz, and is not overlapped with other bandwidths. Each bandwidth of 40M is comprised of two adjacent basic bandwidth channels of 20 MHz, and is not overlapped with other bandwidths. The bandwidth formed by such a channelization mode is referred to as a channelization bandwidth. The composition example of various different channelization bandwidths in the large bandwidth system is shown in FIG. 3.

Presently, the traditional 802.11 device is applied extremely widely, and these traditional BSSs are very likely to be overlapped with the next generation of large bandwidth BSS in terms of coverage. Thus, there will be multiple overlapping BSSs (OBSSs) operating on the same or different channel bandwidths within the same segment of frequency spectrum, thus forming potential interference on the channel with each other. When a large bandwidth is to be used for transmission between the AP and the STA, it is needed to ensure that all the channels which are used by them be in an idle state. However, as there is a number of traditional BSSs, the probability for the large bandwidth BSS to use the maximum bandwidth for transmission is indeed very low, and the probability for collision increases, which leads to a decrease of the efficiency of the large bandwidth transmission.

Therefore, how to efficiently perform data transmission on the large bandwidth and enhance the average effective bandwidth of the system is a problem to be solved in the new generation of 802.11 protocols based on large bandwidths.

SUMMARY OF THE INVENTION

The technical problem to be solved by the present invention is to provide a method and system for channel data transmission in a wireless network, which can take full use of the effective transmission bandwidth under a large bandwidth of the wireless network.

In order to solve the above technical problem, the present invention provides a method for channel data transmission in a wireless network, comprising:

after a transmitting station and a receiving station determine a channel bandwidth to use for data transmission by interaction and negotiation, the transmitting station transmitting data to the receiving station with the determined channel bandwidth.

Wherein, the step of a transmitting station and a receiving station determining a channel bandwidth to use for data transmission by interaction and negotiation comprises:

both the transmitting station and the receiving station exchanging a radio frame on their respective channels, and acquiring information about available channels of both the receiving station and the transmitting station by detecting the exchanged radio frame on the channel of the local station and/or obtaining indication information of available channels carried in the exchanged radio frame;

the transmitting station selecting and determining the channel bandwidth to use for transmitting the data to the receiving station in units of data frames according to the acquired information about available channels of both the receiving station and the transmitting station.

Wherein, the step of the transmitting station and the receiving station acquiring information about available channels of both the receiving station and the transmitting station by detecting the exchanged radio frame on the channel of the local station comprises:

the transmitting station detecting basic channel bandwidths which are idle currently from all basic channel bandwidths on a maximum working bandwidth of the local station, and transmitting a radio frame to the receiving station on the detected one or more basic channel bandwidths which are idle currently, to request for channel subscription;

the receiving station acquiring the information about the available channels of the transmitting station by receiving the radio frame transmitted by the transmitting station on one or more basic channel bandwidths including a main channel of the receiving station, and returning a radio frame to the transmitting station on one or more basic channel bandwidths, which are detected from the available channels of the transmitting station and are available currently for the local station, to acknowledge the channel subscription;

the transmitting station acquiring the information about the available channels of both the transmitting station and the receiving station by receiving the radio frame, which are returned by the receiving station, on one or more basic channel bandwidths including a main channel of the local station.

Wherein, the step of the transmitting station and the receiving station acquiring information about available channels of both the receiving station and the transmitting station by detecting the exchanged radio frame on the channel of the local station and/or obtaining indication information of available channels carried in the exchanged radio frame comprises:

the transmitting station detecting basic channel bandwidths which are idle currently from all basic channel bandwidths on the maximum working bandwidth of the local station, and transmitting a radio frame carrying first indication information of available channels to the receiving station on the detected one or more basic channel bandwidths which are idle currently, to request for channel subscription, wherein, the first indication information of available channels is used to indicate channel bandwidth information to use for transmitting the radio frame or available channel bandwidth information of the local station;

the receiving station acquiring the information about available channels of the transmitting station by receiving the radio frame on one or more basic channel bandwidths including a main channel of the local station and decoding the first indication information of available channels from the received radio frame, and returning a radio frame to the transmitting station on one or more basic channel bandwidths, which are detected from the available channels of the transmitting station and are available currently for the local station, to acknowledge the channel subscription; and the transmitting station acquiring the information about available channels of both the receiving station and the transmitting station by receiving the radio frame returned by the receiving station on one or more basic channel bandwidths including a main channel of the local station. Wherein, the step of the transmitting station and the receiving station acquiring information about available channels of both the receiving station and the transmitting station by detecting the exchanged radio frame on the channel of the local station and/or obtaining indication information of available channels carried in the exchanged radio frame comprises:

the transmitting station detecting basic channel bandwidths which are idle currently from all basic channel bandwidths on the maximum working bandwidth of the local station, and transmitting a radio frame carrying first indication information of available channels to the receiving station on the detected one or more basic channel bandwidths which are idle currently, to request for channel subscription, wherein, the first indication information of available channels is used to indicate channel bandwidth information to use for transmitting the radio frame or available channel bandwidth information of the local station;

the receiving station acquiring the information about available channels of the transmitting station by receiving the radio frame on one or more basic channel bandwidths including a main channel of the local station and decoding the first indication information of available channels from the received radio frame, and returning a radio frame carrying second indication information of available channels to the transmitting station on one or more basic channel bandwidths, which are detected from the available channels of the transmitting station and are available currently for the local station, to acknowledge the channel subscription, wherein, the second indication information of available channels is used to indicate channel bandwidth information to use for returning the radio frame or available channel bandwidth information of the local station;

the transmitting station acquiring the information about available channels of both the receiving station and the transmitting station by receiving the radio frame returned by the receiving station on one or more basic channel bandwidths including a main channel of the local station and decoding the second indication information of available channels from the received radio frame.

Wherein, the step of the transmitting station and the receiving station acquiring information about available channels of both the receiving station and the transmitting station by detecting the exchanged radio frame on the channel of the local station and/or obtaining indication information of available channels carried in the exchanged radio frame comprises:

the transmitting station detecting basic channel bandwidths which are idle currently from all basic channel bandwidths on the maximum working bandwidth of the local station, and transmitting a radio frame to the receiving station on the detected one or more basic channel bandwidths which are idle currently, to request for channel subscription;

the receiving station acquiring the information about available channels of the transmitting station by receiving the radio frame on one or more basic channel bandwidths including a main channel of the local station and decoding the first indication information of available channels from the received radio frame, and returning a radio frame carrying second indication information of available channels to the transmitting station on one or more basic channel bandwidths, which are detected from the available channels of the transmitting station and are available currently of the local station, to acknowledge the channel subscription, wherein, the second indication information of available channels is used to indicate channel bandwidth information to use for returning the radio frame or available channel bandwidth information of the local station;

the transmitting station acquiring the information about available channels of both the receiving station and the transmitting station by receiving the radio frame returned by the receiving station on one or more basic channel bandwidths including a main channel of the local station and decoding the second indication information of available channels from the received radio frame.

Wherein, the step of the transmitting station and the receiving station acquiring information about available channels of both the receiving station and the transmitting station by detecting the exchanged radio frame on the channel of the local station and/or obtaining indication information of available channels carried in the exchanged radio frame comprises:

the receiving station detecting basic channel bandwidths which are idle currently from all basic channel bandwidths on the maximum working bandwidth of the local station, and transmitting a radio frame to the transmitting station on the detected one or more basic channel bandwidths which are idle currently, or transmitting a radio frame carrying second indication information of available channels to the transmitting station on the detected one or more basic channel bandwidths which are idle currently, to acknowledge the channel subscription, wherein, the second indication information of available channels is used to indicate channel bandwidth information to use for returning the radio frame or available channel bandwidth information of the local station;

the transmitting station acquiring the information about available channels of both the receiving station and the transmitting station by receiving the radio frame transmitted by the receiving station on one or more basic channel bandwidths including a main channel of the local station and/or decoding the second indication information of available channels from the received radio frame.

The method further comprises: a visiting station acquiring the channel bandwidth information subscribed by both the transmitting station and the receiving station based on monitoring that both the transmitting station and the receiving station exchange the radio frame on their respective channels, and using a measure of backoff contention to avoid collision of channel bandwidths.

Wherein, the transmitting station is configured to select and determine the channel bandwidth to use for transmitting the data to the receiving station in units of data frames according to the acquired information about available channels of both the receiving station and the transmitting station using any one of the following three modes:

mode one: selecting any basic channel bandwidth as the transmitting channel bandwidth to transmit a data frame of the basic channel bandwidth;

mode two: selecting one channelization bandwidth being double times of the basic channel bandwidth as the transmitting channel bandwidth, to transmit a data frame of one channelization bandwidth;

mode three: after selecting and determining the channel bandwidth to use for transmitting the data to the receiving station in units of data frames, postponing the data frame to be transmitted, competing for the next transmission opportunity for transmission after backoff.

The method further comprises: the transmitting station selecting and determining the channel bandwidth to use for transmitting the data to the receiving station in units of data frames, to use for one or more continuous data frame transmissions between the transmitting station and the receiving station; or to use for one or more data frame transmissions between the transmitting station and the receiving station within limit time of one transmission opportunity.

The method further comprises:

when competing for the channels in a distributed coordination function mode, if the data frame transmitted by the transmitting station carries one or more complete service protocol data units or management protocol control frames, the currently selected and determined channel bandwidth is merely the bandwidth to use for transmitting the current data frame; and if data frame transmitted by the transmitting station carries segment sub-units corresponding to one service protocol data unit or management protocol control frame, the currently selected and determined channel bandwidth is merely the bandwidth to use for the current data frame and subsequently carrying the segment sub-units corresponding to the service protocol data unit or the management protocol control frame;

when competing for the channels in an enhanced distributed coordination access function mode, if the transmitting station transmits one data frame to the receiving station in one transmission opportunity and subsequent one or more data bursts in the current transmission opportunity are still directed to the receiving station, the currently selected and determined channel bandwidth is the bandwidth to use for the current data frame and one or more data frames subsequently transmitted to the receiving station; and if the transmitting station transmits one data frame to the receiving station in one transmission opportunity and subsequent data frames in the current transmission opportunity are directed to other receiving stations, the currently selected and determined channel bandwidth is merely the bandwidth to use for the current data frame.

The present invention further provides a system for channel data transmission in a wireless network, comprising a transmitting station and a receiving station, wherein, the transmitting station is configured to, after determining a channel bandwidth to use for data transmission by interaction and negotiation with the receiving station, transmit data to the receiving station with the determined channel bandwidth; and the receiving station is configured to corporate with the transmitting station for interaction with the local station.

Wherein, both the transmitting station and the receiving station are further configured to exchange a radio frame on respective channels, and acquire information about available channels of both the receiving station and the transmitting station by detecting the exchanged radio frame on the channel of the local station and/or obtaining indication information of available channels carried in the exchanged radio frame; and the transmitting station is further configured to select and determine the channel bandwidth to use for transmitting the data to the receiving station in units of data frames according to the acquired information about available channels of both the receiving station and the transmitting station.

The system further comprises a visiting station, wherein, the visiting station is configured to acquire the channel bandwidth information subscribed by both the transmitting station and the receiving station based on monitoring that both the transmitting station and the receiving station exchange the radio frame on their respective channels, and use a measure of backoff contention to avoid collision of channel bandwidths. Wherein, the transmitting station is configured to transmit data to the receiving station with the determined channel bandwidth using the following modes:

selecting any basic channel bandwidth as the transmitting channel bandwidth to transmit a data frame of the basic channel bandwidth;

or selecting one channelization bandwidth being double times of the basic channel bandwidth as the transmitting channel bandwidth, to transmit a data frame of one channelization bandwidth;

or after selecting and determining the channel bandwidth to use for transmitting the data to the receiving station in units of data frames, postponing the data frame to be transmitted, and competing for the next transmission opportunity for transmission after backoff.

Wherein, the transmitting station is further configured to select and determine the channel bandwidth to use for transmitting the data to the receiving station in units of data frames, to use for one or more continuous data frame transmissions between the transmitting station and the receiving station; or to use for one or more data frame transmissions between the transmitting station and the receiving station within limit time of one transmission opportunity.

The present invention further provides a transmitting station, comprising a channel bandwidth determining module and a data transmitting module, wherein, the channel bandwidth determining module is configured to determine a channel bandwidth to use for data transmission by interaction and negotiation with a receiving station;

the data transmitting module is configured to transmit data to the receiving station with the determined channel bandwidth. Wherein, the channel bandwidth determining module comprises an information about available channels determining module and a channel bandwidth determining sub-module, wherein, the information about available channels determining module is configured to exchange a radio frame on a channel thereof, and acquire information about available channels of both the receiving station and the transmitting station by detecting the exchanged radio frame on the channel of the local station and/or obtaining indication information of available channels carried in the exchanged radio frame;

the channel bandwidth determining sub-module is configured to select and determine the channel bandwidth to use for transmitting the data to the receiving station in units of data frames according to the acquired information about available channels of both the receiving station and the transmitting station.

Wherein, the channel bandwidth determining module is further configured to select any basic channel bandwidth as the transmitting channel bandwidth; and the data transmitting module is further configured to transmit a data frame of one basic channel bandwidth.

Wherein, the channel bandwidth determining module is further configured to select one channelization bandwidth being double times of the basic channel bandwidth as the transmitting channel bandwidth; and the data transmitting module is further configured to transmit a data frame of one channelization bandwidth.

Wherein, the channel bandwidth determining module is further configured to select and determine the channel bandwidth to use for transmitting the data to the receiving station in units of data frames; and the data transmitting module is further configured to after the channel bandwidth determining module selects and determines the channel bandwidth to use for transmitting the data to the receiving station in units of data frames, postpone the data frame to be transmitted, and compete for the next transmission opportunity for transmission after backoff.

Wherein, the channel bandwidth determining module is further configured to select and determine the channel bandwidth to use for transmitting the data to the receiving station in units of data frames; and the data transmitting module is further configured to use the channel bandwidth determined by the channel bandwidth determining module for one or more continuous data frame transmissions between the transmitting station and the receiving station; or for one or more data frame transmissions between the transmitting station and the receiving station within limit time of one transmission opportunity.

The above scheme is primarily a data transmission scheme based on variable bandwidths of the data frames proposed for the data transmission under existing condition of multiple channels and a large bandwidth, to solve the existing collision problem caused by contention for channels between the hidden stations and the current transmission stations, and thus can take full advantage of the effective transmission bandwidth in the large bandwidth system of a wireless network and increase the frequency spectrum utilization of large bandwidth, and at the same time ensure the backward compatibility with the large bandwidth system and its co-existence with conventional systems.

PREFERRED EMBODIMENTS OF THE PRESENT INVENTION

The technical scheme of the present invention will be described in detail in conjunction with accompanying drawings and preferred embodiments hereinafter. It should be understood that the preferred embodiments described here are merely used to illustrate and explain the present invention, and are not used to limit the present invention.

Figure 1:
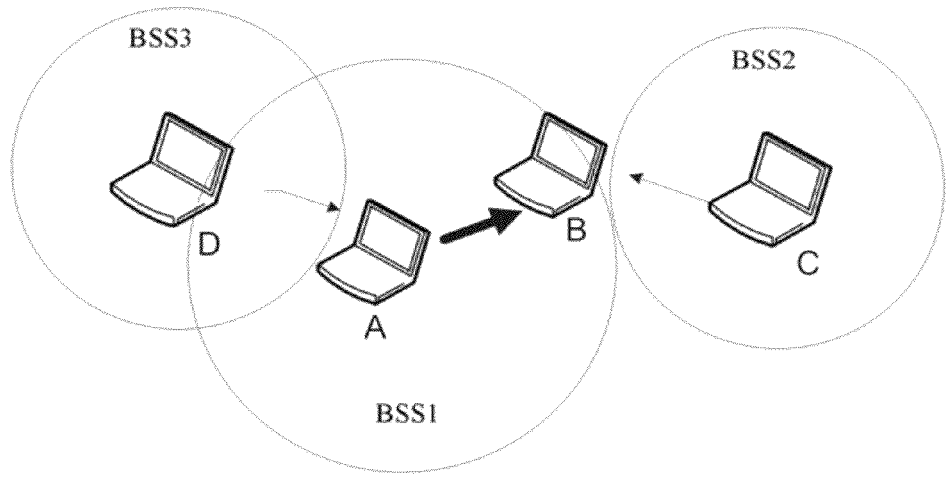
FIG. 1 is a diagram of an existing problem of hidden stations when multiple wireless stations share a wireless channel.
Figure 2:
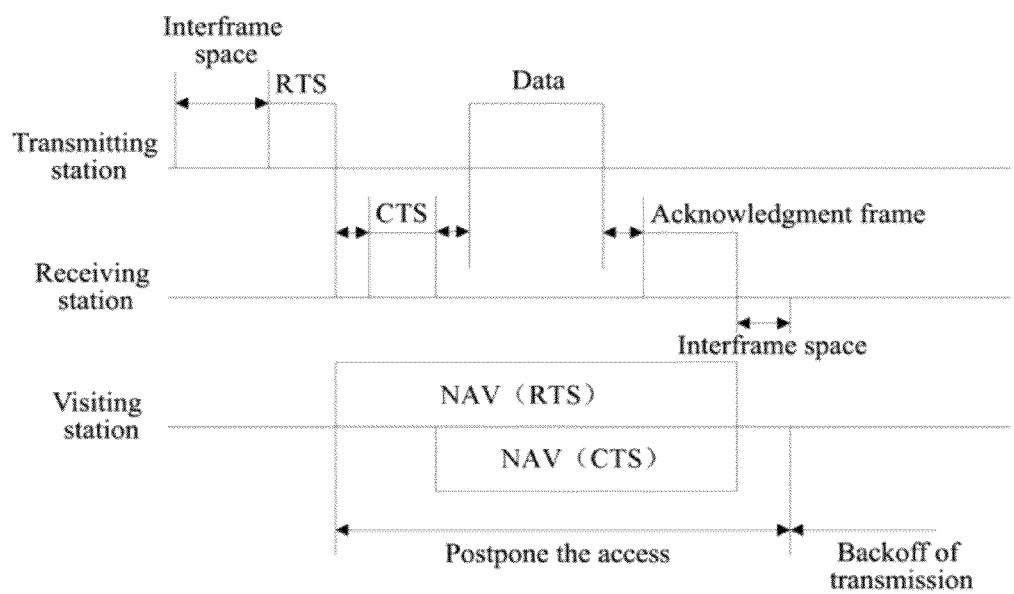
FIG. 2 is a diagram of an existing method for using RTS/CTS frames in the 802.11 protocol.
Figure 3:
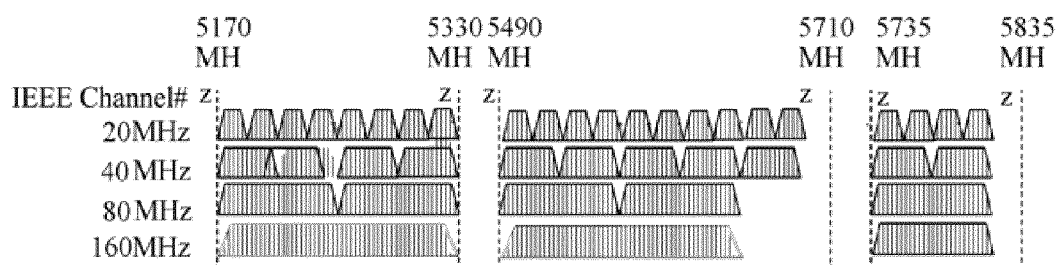
FIG. 3 is a diagram of channelization bandwidths of an existing large bandwidth transmission system composing channels of different bandwidths.
Figure 4:
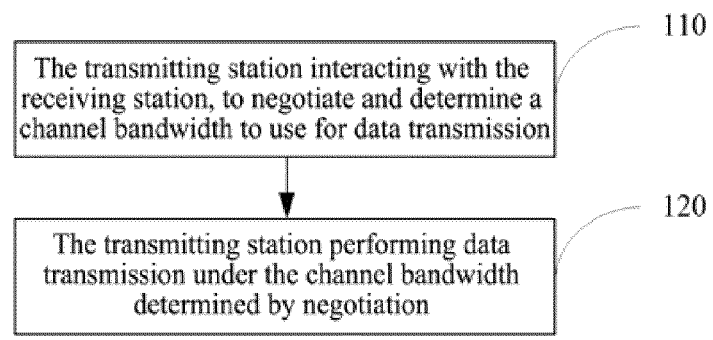
FIG. 4 is a flowchart of a method for channel data transmission in a wireless network according to an embodiment of the present invention.

The method for channel data transmission in a wireless network provided by an embodiment of the present invention, of which the process is shown in FIG. 4, comprises the following steps:

110: the transmitting station interacting with the receiving station, to negotiate and determine a channel bandwidth to use for data transmission;

the transmitting station interacting with the receiving station by exchanging radio frames, which can be control frames dedicated to channel subscription, or can also be other data frames or management frames.

Performing interaction by exchanging radio frames can be implemented by means of detecting the exchanged radio frames on the channel, or can also be implemented by means of carrying indication information of available channels in the exchanged radio frames. The above implementation modes of frame exchange can be embodied by an application example of the method for channel data transmission in a wireless network according to the present invention, which is given hereinafter.

The transmitting station negotiates with the receiving station to determine the channel bandwidth to use for data transmission, including 20 MHz, 40 MHz, 80 MHz, 120 MHz, 160 MHz and other larger channel bandwidths in basic units of 20 MHz, i.e., being comprised of one basic channel bandwidth or multiple non-overlapping continuous or discontinuous basic channel bandwidths.

A visiting station can acquire the channel bandwidth information subscribed by both the transmitting station and the receiving station based on monitoring that both the transmitting station and the receiving station exchange radio frames on their respective channels, and thus can use a measure of backoff contention to avoid collision of channel bandwidths.

120: the transmitting station performing data transmission under the channel bandwidth determined by negotiation.

According to the channel bandwidth used by the radio frame transmitted by the receiving station, the transmitting station selects a transmitting channel bandwidth to use for transmitting the present data frame, or select a transmitting channel bandwidth to use for the present data frame and subsequent data frames, or select a transmitting channel bandwidth to use for only transmitting one or more data frames within the present transmission opportunity time.

The receiving station receives the data frame transmitted by the transmitting station under a channel bandwidth to use by the receiving station for transmitting the channel subscription to acknowledge the channel bandwidth used by the radio frame, and determines the transmitting bandwidth according to the received effective preface information or the information about available channels carried in the radio frame.

The transmitting channel bandwidth selected or determined by the transmitting station or the transmitting channel bandwidth selected or determined by the transmitting station is the bandwidth used by the radio frames which are transmitted by the receiving station, or a part or all of the channel bandwidth indicated by the indication information of available channels carried in the radio frame which is transmitted by the receiving station, and is not larger than the bandwidth used by the radio frame which is transmitted by the transmitting station, or the channel bandwidth indicated by the indication information of available channels carried in the radio frame which is transmitted by the transmitting station. No matter for the transmitting station or the receiving station, both the channelization bandwidths are predefined by the system.

The transmitting station transmits physical layer data frames to the receiving station under the determined channel bandwidth, wherein, the physical layer data frames can carry service data, management protocol data, or carry compound data, or carry segments of the above data.

For the above method embodiments, the present invention correspondingly provides a system for channel data transmission in a wireless network according to an embodiment of the present invention, and the system comprises a transmitting station and a receiving station, wherein, the transmitting station is configured to interact with the receiving station to negotiate and determine a channel bandwidth to use for data transmission, and transmit data to the receiving station with the determined channel bandwidth; and the receiving station is configured to corporate with the transmitting station to interact with the local station, and receive the data transmitted by the transmitting station with the determined channel bandwidth.

The transmitting station interacts with the receiving station by exchanging radio frames, which is implemented by means of detecting the exchanged radio frames on the channel, or is implemented by means of carrying indication information of available channels in the exchanged radio frames. The radio frames can be control frames dedicated to channel subscription, or can also be other data frames or management frames.

The determined channel bandwidth comprises 20 MHz, 40 MHz, 80 MHz, 120 MHz, 160 MHz and other larger channel bandwidths in basic units of 20 MHz, i.e., being comprised of one basic channel bandwidth or multiple non-overlapping continuous or discontinuous basic channel bandwidths.

The above system embodiment further comprises a visiting station, wherein, the visiting station is configured to acquire the channel bandwidth information subscribed by both the transmitting station and the receiving station based on monitoring that both the transmitting station and the receiving station exchange a radio frame on their respective channels, and use a measure of backoff contention to avoid collision of channel bandwidths.

The above method and system embodiments according to the present invention will be further explained in detail by several specific application examples hereinafter.

Application Example One

The transmitting station (transmitting STA) currently supports working bandwidths of 160/120/80/40/20 Mhz, and the receiving station (receiving STA) currently supports working bandwidths of 80/40/20 MHz. Wherein, the bandwidth of 160M is comprised of two continuous or discontinuous bandwidths of 80M, each bandwith of 80M is comprised of two continuous bandwidths of 40M, and each bandwith of 40M is comprised of two continuous basic bandwidth channels of 20 MHz. The current maximum working bandwidth of the transmitting STA and the receiving STA is 80 MHz, and the maximum working bandwdith here refers to the capability of the channel bandwidth supported by the transmitting STA and the receiving STA respectively.

The transmitting STA performs channel detection by a Clear Channel Assessment (CCA) method on each channel of 20 MHz on the current maximum working bandwidth before transmitting a channel subscription Request to send (RTS). On the first channel, after an Arbitration InterFrame Space (AIFS) and random backoff, if it is determined that the first channel is idle, prepares to trasnmit the RTS, and meanwhile, on the second, third and fourth channels, if it is determined that the second, third and fourth channels are idle within a Point (coordination function) InterFrame Space before transmitting the RTS, determines that the channels of 20M which are idle in the 80 MHz are the first, second, third and fourth channels, and transmits the RTSs to the receiving STA respectively on the detected four idle channels of 20 MHz, as shown in step ① illustrated in FIG. 5. Wherein, the first and second channels can constitute one channelization bandwidth of 40 MHz, and the third and fourth channels can constitute another channelization bandwidth of 40 MHz. The first channel is a primary channel, and the second, third and fourth channels are auxiliary channels.

If the receiving STA receives and successfully decodes the RTS on the first channel, it is considered that the primary channel is an available channel. If the receiving STA determines that the RTS is also received on the auxiliary channels by other channel detection methods (for example, methods such as energy detection or preface detection etc.), it is considered that the corresponding auxiliary channels are also available channels, such as the second and fourth channels. The available channels refer to channels on which the receiving STA successfully decodes and/or detects the RTSs which are transmitted by the transmitting station to the receiving station.

Figure 5:
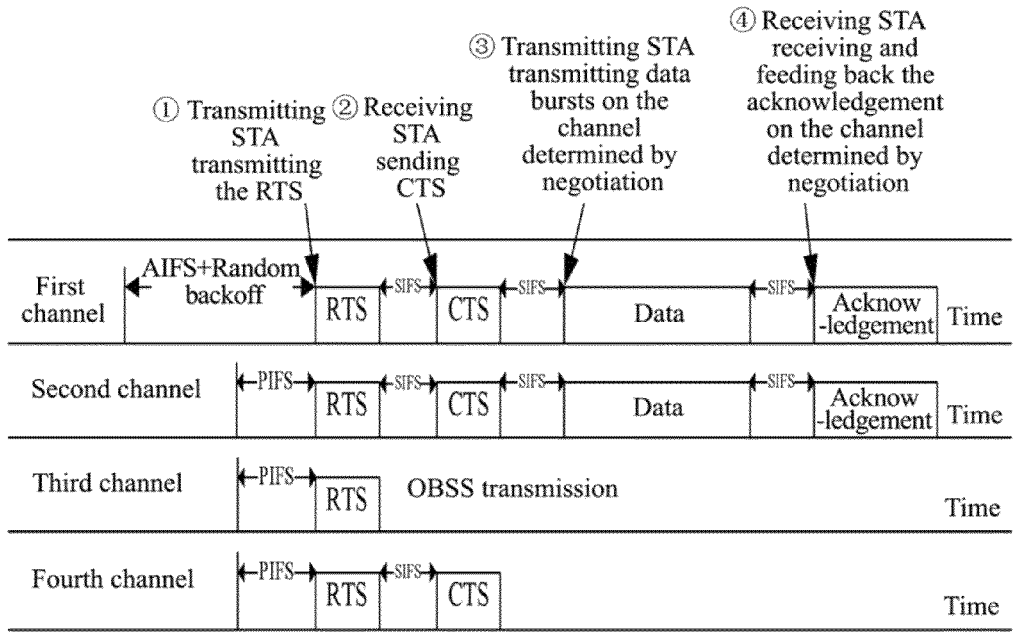
FIG. 5 is a diagram of a method for channel data transmission in a wireless network according to application example one of the present invention.

The receiving STA transmits the CTSs respectively on all or a part of the available channels such as the first, second and fourth channels after a Short Interframe Space (SIFS) behind the RTS, to acknowledge the channel subscription, as shown in step ② illustrated in FIG. 5.

If the transmitting STA receives and successfully decodes the CTS on the first channel (primary channel), it is considered that the primary channel is an available channel. If the transmitting STA can determine that the CTS is also received on the auxiliary channels by other channel detection methods (for example, energy detection or preface detection etc.), it is considered that the corresponding auxiliary channels are also available channels, such as the second and fourth channels. The available channels refer to channels on which the transmitting STA successfully decodes and/or detects the CTSs which are transmitted by the receiving station to the transmitting station.

The transmitting STA determines that the current available channels for both the receiving and transmitting parties are the first, second and fourth channels, i.e., three basic bandwidth channels of 20 MHz, by performing radio frame exchange with the receiving STA. The transmitting STA selects and determines a channel bandwidth for transmitting data frames according to the determined information about available channels of the transmitting STA, and transmits the data frames to the receiving STA with the determined channel bandwidth, as shown in step ③ illustrated in FIG. 5, and can have any one of the following two selections:

First: selecting any basic channel bandwidth of 20 MHz on the first or second or fourth channel as the transmitting channel bandwidth to transmit one data frame of 20 MHz;

Second: selecting two basic bandwidths of 20 MHz on the first and second channels, i.e., a bandwidth of 40 MHz as the transmitting bandwidth, to transmit one data frame of 40 MHz.

In addition, the transmitting STA can further have the third selection: postponing the data frame to be transmitted, and competing for the next transmission opportunity after backoff.

After receiving the data frames transmitted by the transmitting STA, the receiving STA returns a reception Acknowledge (ACK) message to the transmitting STA, as shown in step ④ illustrated in FIG. 5.

Application Example Two

The transmitting station (transmitting STA) currently supports working bandwidths of 160/120/80/40/20 Mhz, and the receiving station (receiving STA) currently supports working bandwidths of 80/40/20 MHz. Wherein, the bandwidth of 160M is comprised of two continuous or discontinuous bandwidths of 80M, each bandwidth of 80M is comprised of two continuous bandwidths of 40M, and each bandwith of 40M is comprised of two continuous basic bandwidth channels of 20 MHz. The current maximum working bandwidth of the transmitting STA and the receiving STA is 80 MHz.

Figure 6:
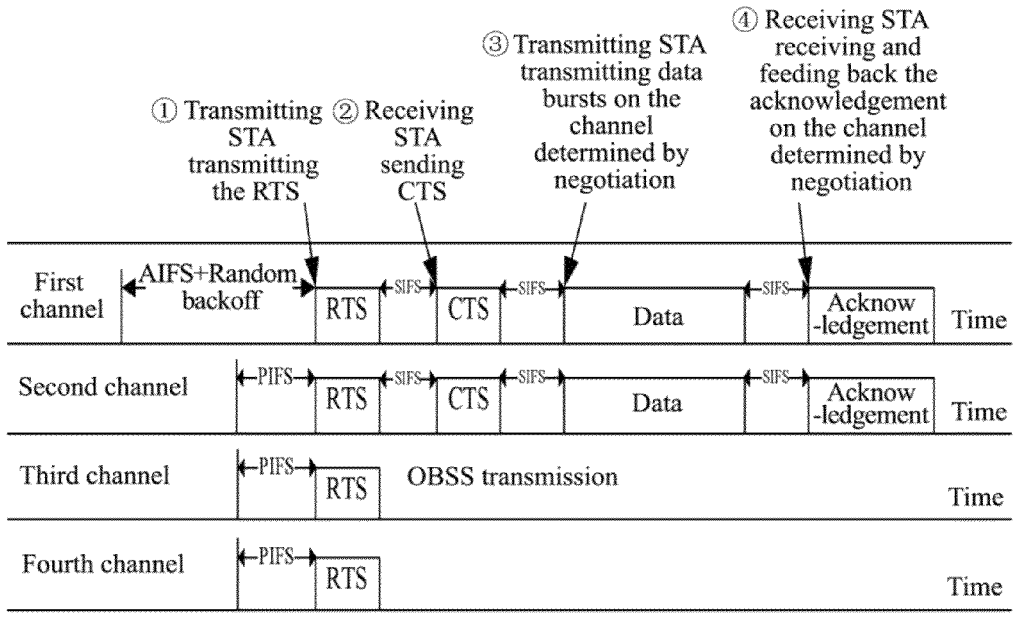
FIG. 6 is a diagram of a method for channel data transmission in a wireless network according to application example two of the present invention.

The transmitting STA performs channel detection by a CCA method on each 20 MHz channel on the current maximum working bandwidth before transmitting a channel subscription Request to send (RTS), on the first channel, after an AIFS and backoff, if it is determined that the first channel is idle, prepares to trasnmit the RTS, and meanwhile, on the second, third and fourth channels, if it is determined that the second, third and fourth channels are idle within a PIFS before transmitting the RTS, determines that the channels of 20M which are idle therein are the first, second, third and fourth channels, and transmits a channel subscription Request to send (RTS) to the receiving STA respectively on the detected four idle channels of 20 MHz, as shown in step ① illustrated in FIG. 6.

If the receiving STA receives and successfully decodes the RTS on the first channel, it is considered that the primary channel is an available channel. If the receiving STA can determine that the RTS is also received on the auxiliary channels by other channel detection methods (for example, energy detection or preface detection etc.), it is considered that the corresponding auxiliary channels are also available channels, such as the second and fourth channels.

The receiving STA transmits the CTS respectively on all or a part of the available channels after a SIFS behind the RTS, such as transmitting the CTS under one channelization bandwidth of 40 MHz including a primary channel (i.e., on the first and second channels), to acknowledge the channel subscription, as shown in step ② illustrated in FIG. 6.

If the transmitting STA receives and successfully decodes the CTS on the first channel, it is considered that the primary channel is an available channel. If the transmitting STA can determine that the CTS is also received on the auxiliary channels by other channel detection methods, it is considered that the corresponding auxiliary channels are also available channels, such as the second channel.

The transmitting STA determines that the current available channels for both the receiving and transmitting parties are the first and second channels, i.e., two basic bandwidth channels of 20 MHz by performing radio frame exchange with the receiving STA. The transmitting STA selects and determines a channel bandwidth for transmitting data frames according to the determined information about available channels of the transmitting STA, and transmits the data frames to the receiving STA with the determined channel bandwidth, as shown in step ③ illustrated in FIG. 6, and can have any one of the following two selections:

First: selecting any basic channel bandwidth of 20 MHz on the first or second channel as the transmitting channel bandwidth to transmit one data frame of 20 MHz;

Second: selecting two basic bandwidths of 20 MHz on the first and second channels, i.e., a bandwidth of 40 MHz as the transmitting bandwidth, to transmit one data frame of 40 MHz.

In addition, the transmitting STA can further have a third selection: postponing the data frame to be transmitted, and competing for the next transmission opportunity after backoff.

After receiving the data frames transmitted by the transmitting STA, the receiving STA returns a reception Acknowledge (ACK) message to the transmitting STA, as shown in step ④ illustrated in FIG. 5.

Embodiment Three

The transmitting STA performs channel detection by CCA on each channel of 20 MHz on the current maximum working bandwidth before transmitting a channel subscription Request to send (RTS), if it is determined that the channels of 20M which are idle currently are the first, second, third and fourth channels, transmits a channel subscription Request to send (RTS) to the receiving STA respectively on one or more channels (equal to or less than four idle channels) including the first channel on the detected four idle channels of 20 MHz.

The RTS transmitted by transmitting STA carries indication information of available channels, which is used to indicate channel bandwidth information to use by the transmitting STA to trasnmit the RTS (or indicate the available channel bandwidth information of the transmitting STA); and the indication information of available channels includes channel serial numbers and/or available maximum bandwidth etc.

If the receiving STA receives and successfully decodes the RTS on the first channel, it is considered that the primary channel is an available channel. Alternatively, if the receiving STA obtains the available channels such as the first, second, third and fourth channels of the transmitting STA by decoding the indication information of available channels carried in the RTS.

The receiving STA trasnmits the CTS respectively on a part or all of the available channels including the first channel to acknowledge the channel subscription. The CTS transmitted by receiving STA carries indication information of available channels, which is used to indicate the channel bandwidth information to use by the receiving STA to trasnmit the CTS (or indicate the available channel bandwidth information of the receiving STA); and the indication information of available channels includes channel serial numbers and/or available maximum bandwidth etc., such as serial numbers of the first and second channels or serial numbers of the first, second and fourth channels.

If the transmitting STA receives and successfully decodes the CTS on the first channel, it is considered that the primary channel is an available channel. If the transmitting STA obtains the current information about available channels of the transmitting and receiving parties by decoding the indication information of available channels carried in the CTS. If the CTS indicates that the first and second channels are the available channels, it can be acquired that the available channels of both the transmitting and receiving parties are the first and second channels, i.e., two basic bandwidth channels of 20 MHz; and if the CTS indicates that the first, second and fourth channels are the available channels, it can be acquired that the current available channels of both the transmitting and receiving parties are the first, second and fourth channels, i.e., three basic bandwidth channels of 20 MHz. The channel bandwidth for transmitting the data frames is selected and determined according to the acquired information, and the data frames are transmitted to the receiving STA with the determined transmitting bandwidth.

The mode for the transmitting STA to select the transmitting bandwidth is the same as those of the application examples one and two.

After receiving the data frames transmitted by the transmitting STA, the receiving STA returns a reception Acknowledge (ACK) message to the transmitting STA.

Application Example Four

As described in the above application example three, the transmitting STA transmits the channel subscription Request to send RTS to the receiving STA respectively on one or more channels including the first channel on the detected four idle channels of 20 MHz, which carries indication information of available channels; and the receiving STA obtains the available channels such as the first, second, third and fourth channels of the transmitting STA by decoding the indication information of available channels carried in the RTS.

The receiving STA trasnmits the CTSs respectively on all or a part of the available channels including the first channel to acknowledge the channel subscription, such as the first and second channels or the first, second and fourth channels.

If the transmitting STA receives and successfully decodes the CTS on the first channel, it is considered that the primary channel is an available channel. If the transmitting STA can determine that the CTS is also received on the auxiliary channels by other channel detection methods, it is considered that the corresponding auxiliary channels are also available channels, such as the second channel or the second and fourth channels.

The transmitting STA selects and determines the channel bandwidth for transmitting the data frames according to the determined information about available channels of the receiving STA, and transmits the data frames to the receiving STA with the determined transmitting bandwidth.

The mode for the transmitting STA to select the channel bandwidth for transmitting the data frames is the same as those of the application examples one and two.

After receiving the data frames transmitted by the transmitting STA, the receiving STA returns a reception Acknowledge (ACK) message to the transmitting STA.

Application Example Five

As described in application example three, the transmitting STA performs channel detection by CCA on each channel of 20 MHz on the current maximum working bandwidth before transmitting a channel subscription Request to send (RTS), if it is determined that the channels of 20M which are idle currently are the first, second, third and fourth channels, transmits a channel subscription Request to send RTS to the receiving STA respectively on the detected four idle channels of 20 MHz.

If the receiving STA receives and successfully decodes the RTS on the first channel, it is considered that the primary channel is an available channel. If the receiving STA can determine that the RTS is also received on the auxiliary channels by other channel detection methods (for example, energy detection or preface detection etc.), it is considered that the corresponding auxiliary channels are also available channels, such as the second and fourth channels.

The receiving STA trasnmits the CTS respectively on all or a part of the available channels including the first channel to acknowledge the channel subscription; and the CTS carries indication information of available channels, which is used to indicate channel bandwidth information to use by the receiving STA to trasnmit the CTS (or indicate available channel bandwidth information of the receiving STA), such as serial numbers of the first and second channels or serial numbers of the first, second and fourth channels.

If the transmitting STA receives and successfully decodes the CTS on the first channel, it is considered that the primary channel is an available channel; and the transmitting STA obtains the information about available channels of the receiving STA by decoding the indication information of available channels carried in the CTS, and selects and determines the channel bandwidth for transmitting the data frames according to the determined information about available channels of the receiving STA, and transmits the data frames to the receiving STA with the determined transmitting bandwidth.

The method for the transmitting STA to select the channel bandwidth for transmitting the data frames is the same as those of the application examples one and two.

After receiving the data frames PPDU transmitted by the transmitting STA, the receiving STA returns a reception Acknowledge (ACK) message to the transmitting STA.

The above application examples are as follows: the receiving STA determines the information about available channels of the transmitting STA according to the RTS frames transmitted by the transmitting STA which are detected on the channels and/or according to the indication information of available channels carried in the RTS frames, and thus detects the available channel of the local station from the available channels of the transmitting STA, and makes the transmitting STA acquire the information about available channels of both the receiving and transmitting parties by the returned CTS frame and/or the indication information of available channels carried in the returned CTS frame.

In practice, the receiving STA can also actively notify the transmitting STA of the detected available channel of the local station by means of the transmitted CTS frame and/or the indication information of available channels carried in the transmitted CTS frame directly, to make the transmitting STA acquire the information about available channels of both the receiving and transmitting parties therefrom.

Application Example Six

Similarly to the above application examples one to five, the transmitting STA transmits data frames to the receiving STA according to the selected channel bandwidth. Wherein, the selected channel bandwidth is applied to the transmission of one or more continuous data frames between the local transmitting STA and the local receiving STA, or is applied to the transmission of one or more data frames between the local transmitting STA and the local receiving STA within limit time of one Transmission Opportunity (TXOP).

The examples of the specific conditions are as follows:

When competing for channels by means of DCF, if the data frames transmitted by the transmitting STA carry one or more complete MAC SDUs (MSDUs) or Management MAC PDUs (MMPDUs), the channel bandwidth which is subscribed currently is merely the bandwidth to use for transmission of the current data frames; and if the data frames transmitted by the transmitting STA carry one MSDU or segment sub-units corresponding to the MMPDU, the channel bandwidth which is subscribed currently is merely the bandwidth to use for the current data frame and subsequently carrying the segment sub-units corresponding to the above MSDU/MMPDU.

When competing for channels by means of EDCA, if the transmitting STA transmits one data frame to the receiving STA in one TXOP and subsequent one or more data bursts in the current TXOP are still directed to the receiving STA, the channel bandwidth which is subscribed currently is the bandwidth to use for the current data frame and for the one or more data frame subsequently transmitted to the receiving STA; and if the transmitting STA transmits one data frame to the receiving STA in one TXOP and subsequent data frames in the current TXOP are directed to other receiving STAs, the channel bandwidth which is subscribed currently is merely the bandwidth to use for the current data frame.

The above description is only the preferred embodiments of the present invention and is not intended to limit the present invention. The invention can have a variety of changes and variations for those skilled in the art. Any modification, equivalent substitution, improvement etc. which are made within the spirit and principle of the present invention should belong to the protection scope of the present invention.

Industrial Application

The above scheme is primarily a data transmission scheme based on variable bandwidths of the data frames proposed for the data transmission under existing condition of multiple channels and a large bandwidth, to solve the existing collision problem caused by contention for channels between the hidden stations and the current transmission stations, and thus can take full advantage of the effective transmission bandwidth in the large bandwidth system of a wireless network and increase the frequency spectrum utilization of large bandwidth, and at the same time ensure the backward compatibility with the large bandwidth system and its co-existence with conventional systems, thus the scheme is of great industrial practicality.

What is claimed is:

1. A method for channel data transmission in a wireless network, comprising:

after a transmitting station and a receiving station determine a channel bandwidth to use for data transmission by interaction and negotiation, the transmitting station transmitting data to the receiving station with the determined channel bandwidth;

wherein the transmitting station determines the channel bandwidth to use for transmitting the data to the receiving station in units of data frames; the determined channel bandwidth is used for one or more continuous data frame transmissions between the transmitting station and the receiving station; or is used for one or more data frame transmissions between the transmitting station and the receiving station within limit time of one transmission opportunity;

when competing for the channels in a distributed coordination function mode, if the data frame transmitted by the transmitting station carries one or more complete service protocol data units or management protocol control frames, the currently determined channel bandwidth is merely the bandwidth to use for transmitting the current data frame; and if the data frame transmitted by the transmitting station carries segment sub-units corresponding to one service protocol data unit or management protocol control frame, the currently determined channel bandwidth is merely the bandwidth to use for the current data frame and subsequently carrying the segment sub-units corresponding to the service protocol data unit or the management protocol control frame;

when competing for the channels in an enhanced distributed coordination access function mode, if the transmitting station transmits one data frame to the receiving station in one transmission opportunity and subsequent one or more data bursts in the current transmission opportunity are still directed to the receiving station, the currently determined channel bandwidth is the bandwidth to use for the current data frame and one or more data frames subsequently transmitted to the receiving station; and if the transmitting station transmits one data frame to the receiving station in one transmission opportunity and subsequent data frames in the current transmission opportunity are directed to other receiving stations, the currently determined channel bandwidth is merely the bandwidth to use for the current data frame.

2. The method for channel data transmission according to claim 1, wherein, the step of a transmitting station and a receiving station determining a channel bandwidth to use for data transmission by interaction and negotiation comprises:

both the transmitting station and the receiving station exchanging a radio frame on their respective channels, and acquiring information about available channels of both the receiving station and the transmitting station by detecting the exchanged radio frame on their respective channels and/or obtaining indication information of available channels carried in the exchanged radio frame;

the transmitting station determining the channel bandwidth to use for transmitting the data to the receiving station in units of data frames according to the acquired information about available channels of both the receiving station and the transmitting station.

3. The method for channel data transmission according to claim 2, wherein, the step of the transmitting station and the receiving station acquiring information about available channels of both the receiving station and the transmitting station by detecting the exchanged radio frame on their respective channels comprises:

the transmitting station detecting basic channel bandwidths which are idle currently from all basic channel bandwidths on a maximum working bandwidth of the transmitting station, and transmitting a radio frame to the receiving station on the detected one or more basic channel bandwidths which are idle currently, to request for channel subscription;

the receiving station acquiring the information about the available channels of the transmitting station by receiving the radio frame transmitted by the transmitting station on one or more basic channel bandwidths including a main channel of the receiving station, and returning a radio frame to the transmitting station on one or more basic channel bandwidths, which are detected from the available channels of the transmitting station and are available currently for the receiving station, to acknowledge the channel subscription;

the transmitting station acquiring the information about the available channels of both the transmitting station and the receiving station by receiving the radio frame, which are returned by the receiving station, on one or more basic channel bandwidths including a main channel of the transmitting station.

4. The method for channel data transmission according to claim 2, wherein, the step of the transmitting station and the receiving station acquiring information about available channels of both the receiving station and the transmitting station by detecting the exchanged radio frame on their respective channels and/or obtaining indication information of available channels carried in the exchanged radio frame comprises:

the transmitting station detecting basic channel bandwidths which are idle currently from all basic channel bandwidths on the maximum working bandwidth of the transmitting station, and transmitting a radio frame carrying first indication information of available channels to the receiving station on the detected one or more basic channel bandwidths which are idle currently, to request for channel subscription, wherein, the first indication information of available channels is used to indicate channel bandwidth information to use for transmitting the radio frame or available channel bandwidth information of the transmitting station;

the receiving station acquiring the information about available channels of the transmitting station by receiving the radio frame on one or more basic channel bandwidths including a main channel of the receiving station and decoding the first indication information of available channels from the received radio frame, and returning a radio frame to the transmitting station on one or more basic channel bandwidths, which are detected from the available channels of the transmitting station and are available currently for the receiving station, to acknowledge the channel subscription; and the transmitting station acquiring the information about available channels of both the receiving station and the transmitting station by receiving the radio frame returned by the receiving station on one or more basic channel bandwidths including a main channel of the transmitting station.

5. The method for channel data transmission according to claim 2, wherein, the step of the transmitting station and the receiving station acquiring information about available channels of both the receiving station and the transmitting station by detecting the exchanged radio frame on their respective channels and/or obtaining indication information of available channels carried in the exchanged radio frame comprises:

the transmitting station detecting basic channel bandwidths which are idle currently from all basic channel bandwidths on the maximum working bandwidth of the transmitting station, and transmitting a radio frame carrying first indication information of available channels to the receiving station on the detected one or more basic channel bandwidths which are idle currently, to request for channel subscription, wherein, the first indication information of available channels is used to indicate channel bandwidth information to use for transmitting the radio frame or available channel bandwidth information of the transmitting station;

the receiving station acquiring the information about available channels of the transmitting station by receiving the radio frame on one or more basic channel bandwidths including a main channel of the receiving station and decoding the first indication information of available channels from the received radio frame, and returning a radio frame carrying second indication information of available channels to the transmitting station on one or more basic channel bandwidths, which are detected from the available channels of the transmitting station and are available currently for the receiving station, to acknowledge the channel subscription, wherein, the second indication information of available channels is used to indicate channel bandwidth information to use for returning the radio frame or available channel bandwidth information of the receiving station;

the transmitting station acquiring the information about available channels of both the receiving station and the transmitting station by receiving the radio frame returned by the receiving station on one or more basic channel bandwidths including a main channel of the transmitting station and decoding the second indication information of available channels from the received radio frame.

6. The method for channel data transmission according to claim 2, wherein, the step of the transmitting station and the receiving station acquiring information about available channels of both the receiving station and the transmitting station by detecting the exchanged radio frame on their respective channels and/or obtaining indication information of available channels carried in the exchanged radio frame comprises:

the transmitting station detecting basic channel bandwidths which are idle currently from all basic channel bandwidths on the maximum working bandwidth of the transmitting station, and transmitting a radio frame to the receiving station on the detected one or more basic channel bandwidths which are idle currently, to request for channel subscription;

the receiving station acquiring the information about available channels of the transmitting station by receiving the radio frame on one or more basic channel bandwidths including a main channel of the receiving station and decoding the first indication information of available channels from the received radio frame, and returning a radio frame carrying second indication information of available channels to the transmitting station on one or more basic channel bandwidths, which are detected from the available channels of the transmitting station and are available currently of the receiving station, to acknowledge the channel subscription, wherein, the second indication information of available channels is used to indicate channel bandwidth information to use for returning the radio frame or available channel bandwidth information of the receiving station;

the transmitting station acquiring the information about available channels of both the receiving station and the transmitting station by receiving the radio frame returned by the receiving station on one or more basic channel bandwidths including a main channel of the transmitting station and decoding the second indication information of available channels from the received radio frame.

7. The method for channel data transmission according to claim 2, wherein, the step of the transmitting station and the receiving station acquiring information about available channels of both the receiving station and the transmitting station by detecting the exchanged radio frame on their respective channels and/or obtaining indication information of available channels carried in the exchanged radio frame comprises:

the receiving station detecting basic channel bandwidths which are idle currently from all basic channel bandwidths on the maximum working bandwidth of the receiving station, and transmitting a radio frame to the transmitting station on the detected one or more basic channel bandwidths which are idle currently, or transmitting a radio frame carrying second indication information of available channels to the transmitting station on the detected one or more basic channel bandwidths which are idle currently, to acknowledge the channel subscription, wherein, the second indication information of available channels is used to indicate channel bandwidth information to use for returning the radio frame or available channel bandwidth information of the receiving station;

the transmitting station acquiring the information about available channels of both the receiving station and the transmitting station by receiving the radio frame transmitted by the receiving station on one or more basic channel bandwidths including a main channel of the transmitting station and/or decoding the second indication information of available channels from the received radio frame.

8. The method for channel data transmission according to claim 2, wherein, the transmitting station determines the channel bandwidth to use for transmitting the data to the receiving station in units of data frames according to the acquired information about available channels of both the receiving station and the transmitting station using any one of the following three modes:

mode one: selecting any basic channel bandwidth as the transmitting channel bandwidth to transmit a data frame of the basic channel bandwidth;

mode two: selecting one channelization bandwidth being an even multiple of the basic channel bandwidth as the transmitting channel bandwidth, to transmit a data frame of one channelization bandwidth;

mode three: after determining the channel bandwidth to use for transmitting the data to the receiving station in units of data frames, postponing the data frame to be transmitted, competing for the next transmission opportunity for transmission after backoff.

9. A system for channel data transmission in a wireless network, comprising a transmitting station and a receiving station, wherein, the transmitting station is configured to, determine a channel bandwidth to use for transmitting data to the receiving station in units of data frames by interaction and negotiation with the receiving station, transmit the data to the receiving station with the determined channel bandwidth; and the receiving station is configured to co-operate with the transmitting station for interaction and negotiation;

wherein the determined channel bandwidth is used for one or more continuous data frame transmissions between the transmitting station and the receiving station; or is used for one or more data frame transmissions between the transmitting station and the receiving station within limit time of one transmission opportunity;

when competing for the channels in a distributed coordination function mode, if the data frame transmitted by the transmitting station carries one or more complete service protocol data units or management protocol control frames, the currently determined channel bandwidth is merely the bandwidth to use for transmitting the current data frame; and if the data frame transmitted by the transmitting station carries segment sub-units corresponding to one service protocol data unit or management protocol control frame, the currently determined channel bandwidth is merely the bandwidth to use for the current data frame and subsequently carrying the segment sub-units corresponding to the service protocol data unit or the management protocol control frame;

when competing for the channels in an enhanced distributed coordination access function mode, if the transmitting station transmits one data frame to the receiving station in one transmission opportunity and subsequent one or more data bursts in the current transmission opportunity are still directed to the receiving station, the currently determined channel bandwidth is the bandwidth to use for the current data frame and one or more data frames subsequently transmitted to the receiving station; and if the transmitting station transmits one data frame to the receiving station in one transmission opportunity and subsequent data frames in the current transmission opportunity are directed to other receiving stations, the currently determined channel bandwidth is merely the bandwidth to use for the current data frame.

10. The system for channel data transmission according to claim 9, wherein, both the transmitting station and the receiving station are further configured to exchange a radio frame on respective channels, and acquire information about available channels of both the receiving station and the transmitting station by detecting the exchanged radio frame on the respective channels and/or obtaining indication information of available channels carried in the exchanged radio frame; and the transmitting station is further configured to determine the channel bandwidth to use for transmitting the data to the receiving station in units of data frames according to the acquired information about available channels of both the receiving station and the transmitting station.

11. The system for channel data transmission according to claim 9, wherein, the transmitting station is configured to transmit data to the receiving station with the determined channel bandwidth using the following modes:
selecting any basic channel bandwidth as the transmitting channel bandwidth to transmit a data frame of the basic channel bandwidth;
or selecting one channelization bandwidth being an even multiple of the basic channel bandwidth as the transmitting channel bandwidth, to transmit a data frame of one channelization bandwidth;
or after determining the channel bandwidth to use for transmitting the data to the receiving station in units of data frames, postponing the data frame to be transmitted, and competing for the next transmission opportunity for transmission after backoff.

12. The system for channel data transmission according to claim 9, wherein, the transmitting station is further configured to determine the channel bandwidth to use for transmitting the data to the receiving station in units of data frames, to use for one or more continuous data frame transmissions between the transmitting station and the receiving station; or to use for one or more data frame transmissions between the transmitting station and the receiving station within limit time of one transmission opportunity.

13. A transmitting station, comprising a processor, and a storage device storing instructions that, when executed, cause the transmitting station to
determine a channel bandwidth to use for transmitting data to a receiving station in units of data frames by interaction and negotiation with the receiving station; and
transmit data to the receiving station with the determined channel bandwidth;
wherein the determined channel bandwidth is used for one or more continuous data frame transmissions between the transmitting station and the receiving station; or is used for one or more data frame transmissions between the transmitting station and the receiving station within limit time of one transmission opportunity;
when competing for the channels in a distributed coordination function mode, if the data frame transmitted by the transmitting station carries one or more complete service protocol data units or management protocol control frames, the currently determined channel bandwidth is merely the bandwidth to use for transmitting the current data frame; and if the data frame transmitted by the transmitting station carries segment sub-units corresponding to one service protocol data unit or management protocol control frame, the currently determined channel bandwidth is merely the bandwidth to use for the current data frame and subsequently carrying the segment sub-units corresponding to the service protocol data unit or the management protocol control frame;
when competing for the channels in an enhanced distributed coordination access function mode, if the transmitting station transmits one data frame to the receiving station in one transmission opportunity and subsequent one or more data bursts in the current transmission opportunity are still directed to the receiving station, the currently determined channel bandwidth is the bandwidth to use for the current data frame and one or more data frames subsequently transmitted to the receiving station; and if the transmitting station transmits one data frame to the receiving station in one transmission opportunity and subsequent data frames in the current transmission opportunity are directed to other receiving stations, the currently determined channel bandwidth is merely the bandwidth to use for the current data frame.

14. The transmitting station according to claim 13, wherein, the instructions cause the transmitting station to
exchange a radio frame on a channel thereof, and acquire information about available channels of both the receiving station and the transmitting station by detecting the exchanged radio frame on the channel and/or obtaining indication information of available channels carried in the exchanged radio frame;
determine the channel bandwidth to use for transmitting the data to the receiving station in units of data frames according to the acquired information about available channels of both the receiving station and the transmitting station.

15. The transmitting station according to claim 13, wherein, the instructions cause the transmitting station to
select any basic channel bandwidth as the transmitting channel bandwidth; and
transmit a data frame of one basic channel bandwidth.

16. The transmitting station according to claim 13, wherein, the instructions cause the transmitting station to
select one channelization bandwidth being an even multiple of a basic channel bandwidth as the transmitting channel bandwidth;
transmit a data frame of one channelization bandwidth.

17. The transmitting station according to claim 13, wherein, the instructions cause the transmitting station to
determine the channel bandwidth to use for transmitting the data to the receiving station in units of data frames;
determining the channel bandwidth to use for transmitting the data to the receiving station in units of data frames, postpone the data frame to be transmitted, and compete for the next transmission opportunity for transmission after backoff.

18. The transmitting station according to claim 13, wherein, the instructions cause the transmitting station to
determine the channel bandwidth to use for transmitting the data to the receiving station in units of data frames; and
use the channel bandwidth for one or more continuous data frame transmissions between the transmitting station and the receiving station; or for one or more data frame transmissions between the transmitting station and the receiving station within limit time of one transmission opportunity.

* * * * *